No. 751,550. PATENTED FEB. 9, 1904.
R. E. PENNINGTON & J. BELLETT.
NUT LOCK.
APPLICATION FILED JUNE 22, 1903.
NO MODEL.

WITNESSES: Richard E. Pennington
and James Bellett
INVENTORS.

BY
ATTORNEY

No. 751,550. Patented February 9, 1904.

UNITED STATES PATENT OFFICE.

RICHARD E. PENNINGTON AND JAMES BELLETT, OF MELBOURNE, VICTORIA, AUSTRALIA.

NUT-LOCK.

SPECIFICATION forming part of Letters Patent No. 751,550, dated February 9, 1904.

Application filed June 22, 1903. Serial No. 162,512. (No model.)

*To all whom it may concern:*

Be it known that we, RICHARD E. PENNINGTON and JAMES BELLETT, subjects of the King of Great Britain, residing at Melbourne, State of Victoria, in the Commonwealth of Australia, have invented certain new and useful Improvements in Nut-Locks, of which the following is a specification.

This invention relates to improvements in nut-locks; and the object thereof is to construct a nut-lock which will be effectual in preventing any of a series of nuts from turning and which will be capable of quick adjustment and removal.

We accomplish our object by the construction illustrated in the accompanying drawings, in which—

Figure 1:
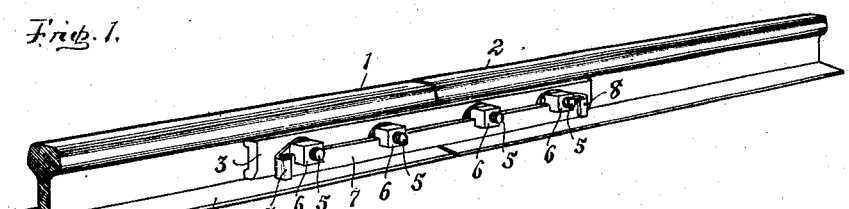
Figure 8:
Figure 7:
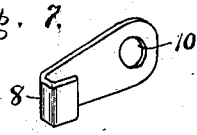
Figure 2:
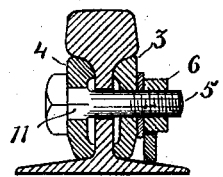
Figure 9:
Figure 10:
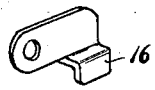
Figure 3:
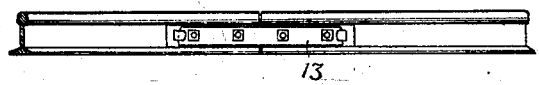
Figure 4:
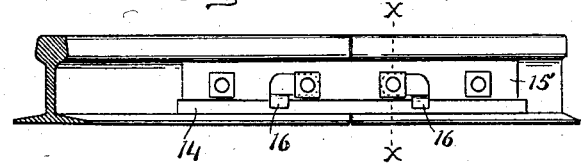
Figure 5:
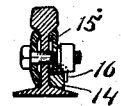
Figure 6:
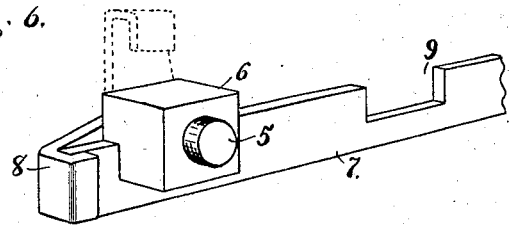

Figure 1 is a perspective view of a rail-joint equipped with our invention. Fig. 2 is a vertical section through a rail-joint, showing the nut-lock in place. Fig. 3 is a side elevation of a rail-joint, showing a modified form of lock-plate. Fig. 4 is a similar view showing another modification. Fig. 5 is a cross-section of Fig. 4 on the line X X. Fig. 6 is a perspective view showing a portion of the lock-plate adjusted to a nut. Fig. 7 is a perspective view of the retaining-clip, and Figs. 8, 9, and 10 are perspective views showing modified forms of retaining-clips.

Similar numerals of reference indicate corresponding parts throughout the several views, and referring now to the same—

1 and 2 are abutting ends of railway-rails held together by fish-plates 3 and 4 and a series of bolts 5, which pass through the rails and fish-plates and which have a corresponding series of nuts 6, driven upon the ends thereof.

This invention consists of the lock-plate 7, arranged in engagement with the series of nuts 6, and the clips 8, which are designed to hold the said lock-plate in place. The lock-plate 7 consists of a bar of metal having in its upper edge notches 9, suitably shaped to snugly fit the lower portions of the nuts 6 when the lock-plate is properly adjusted in place, and thereby prevent said nuts from turning, and the clips 7 have hooked outer ends suited to fit over the ends of the lock-plates, and perforations 10, by which said clips are suited to fit over the shanks of the bolts 5 and to turn thereon.

It is essential in using this invention that the bolts 5 be anchored so as not to turn, and therefore square shoulders 11 are formed on the bolts at points contiguous to their heads, and said shoulders fit snugly in the fish-plate 4.

In use the clips 8 are placed upon the bolts 5, which are nearest the ends of the fish-plates and between the fish-plate 3 and the nuts 6 and in position indicated in dotted outline in Fig. 6. The lock-plate is then placed in position with its lower edge resting upon the foot 12 of the rails and with its notches 9 in engagement with the lower sides of the nuts 6. The clips 8 are then forcibly turned upon the bolts until their hooked ends engage the ends of the lock-plate, and thereby hold said lock-plate in position. It is obvious that while the lock-plate is in adjusted position the nuts thus engaged will be prevented from turning upon the bolts, and thereby becoming loose.

In Fig. 3 is shown a lock-plate 13, which is a modification of the lock-plate 7, hereinbefore mentioned. In this form the lock-plate 13 fits over and completely surrounds the nuts instead of having notches to engage the lower parts of the nuts only.

In Fig. 4 is shown a lock-plate 14, which is a modification of the lock-plate 7. In this form the lock-plate 14 consists of a straight bar of metal, which ranges beneath the fish-plate 15 and extends under the nuts and engages their lower sides. When lock-plates of the forms shown in Figs. 1 and 3 are used, retaining-clips may be used of the forms shown in Figs. 7, 8, or 9, and when the lock-plate 14 (shown in Fig. 4) is used the retaining-clip 16 (shown in Fig. 10) is employed.

Having described our invention, what we claim as new, and desire to secure by Letters Patent, is—

In a nut-lock, a series of anchored bolts; a series of nuts thereon; a lock-plate arranged in engagement with said series of nuts; and one or more clips mounted respectively upon one or more of the bolts of said series of bolts, and being held thereon by means of the corresponding nuts, the said clips being adapted to be turned upon said bolts and placed into engagement with said lock-plate and thereby hold the lock-plate in proper position.

In testimony whereof we affix our signatures in presence of two witnesses.

RICHARD E. PENNINGTON.
JAMES BELLETT.

Witnesses:
PERCY HEDGES,
SIDNEY HENDLEY.